United States Patent Office 3,814,754
Patented June 4, 1974

3,814,754
CLEAVAGE OF 7-ACYLAMINO CEPHALOSPORINS
Billy G. Jackson, Indianapolis, Ind., assignor to Eli Lilly and Company, Indianapolis, Ind.
No Drawing. Continuation-in-part of abandoned application Ser. No. 805,823, Mar. 10, 1969. This application June 10, 1971, Ser. No. 151,993
Int. Cl. C07d 99/24
U.S. Cl. 260—243 C          5 Claims

ABSTRACT OF THE DISCLOSURE

Trichloroethyl and p-nitrobenzyl esters of 3-methyl-7-acylamido cephalosporins are converted to the corresponding 3-methyl-7-amino esters by treatment with water or a lower alkanol in the presence of a strong acid.

CROSS-REFERENCE

This application is a continuation-in-part of my copending application Ser. No. 805,823, filed Mar. 10, 1969, now abandoned.

BACKGROUND OF THE INVENTION

It is well known that the activity of antibiotics of the cephalosporin family is influenced by the nature of the group in the 7-position. Therefore, considerable effort has gone into the development of commercially feasible methods for the removal of substituent groups from the 7-position. For example, Morin et al. United States Patent 3,188,311 discloses a method for the conversion of cephalosporin C to 7-ACA. The process described in that patent makes it possible to prepare useful antibiotics from cephalosporin C, a fermentation product.

In U.S. Pat. 3,207,755 there is described a process wherein cephalosporin C is treated with an acid to yield a variety of products. One of the products of this reaction is 7-ACA; however, the yield is extremely small. In Example 1, for instance, from 2 g. of cephalosporin C there was obtained an estimated 43 micrograms of 7-ACA.

British Pat. 957,569 also teaches an acid hydrolysis of cephalosporin C or desacetoxy cephalosporin C. Both compounds are subjected to hydrolysis in the form of the free acid, and if the product is to be subjected to further reaction it is necessary to protect the carboxyl group by esterification or in some other manner.

As a result of the process described in Morin and Jackson U.S. Pat. 3,275,636 it is now possible to obtain cephalosporin esters from penicillins. The cephalosporins obtained by this process are substituted in the 3-position with a methyl group rather than an acetoxymethyl group as in cephalosporin C. The substituent in the 7-position of the cephalosporins obtained by the Morin-Jackson process is that present in the 6-position of the penicillin starting material. It is necessary to first remove this substituent in order to prepare cephalosporins with different antibiotic activity.

SUMMARY

I have now succeeded in obtaining 3-methyl-7-aminocephalosporin esters by treating a 7-substituted alkanoylamido cephalosporin trichloroethyl or p-nitrobenzyl ester with at least one mole of water, methanol, ethanol, or propanol at a temperature of 0° to 125° C. in the presence of at least 0.25 equivalent of an acid having a pKa of less than 3. The 7-amino compounds obtained by my process can be acylated by known acylation procedures, followed by ester cleavage to prepare antibiotically-active cephalosporins. My process will probably find its greatest application in the treatment of 7-substituted alkanoylamido cephalosporins prepared from penicillins by the Morin-Jackson process.

DESCRIPTION OF THE PREFERRED EMBODIMENTS

In accordance with my process a compound having the formula:

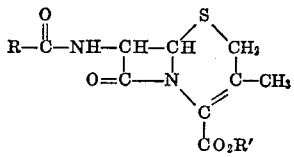

is treated with at least one mole of a solvent having the formula:

R″—OH to obtain a product having the formula

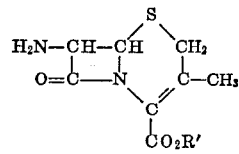

wherein R is:

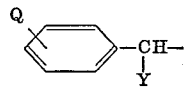

or

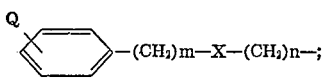

Q is hydrogen, $C_1$ to $C_3$ alkyl, $C_1$ to $C_3$ alkoxy, cyano, nitro, hydroxy, chloro, bromo, or fluoro;
Y is hydrogen or hydroxy;
X is oxygen or sulfur;
m is an integer of 0 to 2;
n is an integer of 1 to 3;
R′ is 2,2,2-trichloroethyl or p-nitrobenzyl; and
R″ is hydrogen, methyl, ethyl or propyl.

R may be such groups as benzyl, m-chlorobenzyl, p-cyanobenzyl, α-hydroxybenzyl, α-hydroxy-o-ethylbenzyl, phenoxymethyl, benzyloxymethyl, p-nitrobenzyloxymethyl, phenoxyethyl, thiophenoxyethyl, o-methylthiophenoxyethyl, and p-methoxybenzyloxyethyl. My process will find its greatest application with those compounds wherein R is benzyl or phenoxymethyl since such compounds can be obtained from penicillin G and penicillin V by the Morin Jackson process.

The carboxyl group in the starting material for my process is present as the 2,2,2-trichloroethyl or p-nitrobenzyl ester. Unlike many esters, these groups are stable to the acid hydrolysis conditions so that they remain on the hydrolysis product to protect the carboxyl group on subsequent reactions. However, they can be removed by reduction under acidic conditions to regenerate the free carboxyl group when desired.

In accordance with my process the acylated cephalosporin starting material is treated with a molar excess of water or a lower alkanol such as methanol, ethanol, or propanol. Water is preferred. It appears that a solvolysis of the amide linkage occurs with the formation of the free amine and an acid when water is the solvent or an ester when an alcohol is the solvent. It is to be understood of course that mixtures of these solvents may be used. At least one mole of the reactive solvent should be used per mole of starting cephalosporin compound. It is preferred to use an excess of the reactive solvent, and this is usually done. Any excess may be used limited only by the equipment needed to separate the products of the reaction from the excess solvent. When water is the sole reactive solvent it is preferred to use an inert organic co-solvent to aid in maintaining starting materials and products in solution. This co-solvent should be miscible with water. Suitable co-solvents include tetrahydrofuran, dioxane, acetone, dimethylsulfoxide, acetonitrile, dimethylformamide, and dimethylacetamide.

The reaction between the acylated cephalosporin and the reactive solvent is conducted in the presence of a strong acid having a pKa of less than 3. This acid may be a mineral acid or an organic acid. Examples of such acids include p-toluenesulfonic acid, methanesulfonic acid, trifluoroacetic acid, hydrochloric acid, sulfuric acid and phosphoric acid. The preferred acid is p-toluenesulfonic acid. At least 0.25 equivalent of acid per mole of acylated cephalosporin should be used and preferably one equivalent or more of acid is used. As much as a 20 to 25 fold exces of acid may be employed but such excesses are unnecessary.

The reaction may be conducted at a temperature within the range of 0° to about 125° C. The preferred temperature is 25° to 75° The time of the reaction is a function of the acid employed, the solvent employed, and the temperature. The time will normally be from about 1 to about 60 hours and will usually be less than 12 hours.

My process will be further illustrated by the following examples.

Example 1

A solution of 20 g. of p-nitrobenzyl 3-methyl-7-phenoxy acetamido-Δ³-cephem-4-carboxylate and 16 g. of p-toluenesulfonic acid monohydrate in 16 ml. of water and 70 ml. of tetrahydrofuran was stirred and heated under reflux for a period of 3 hours. At the end of this time 54 ml. of water was added and the mixture was stirred and chilled in an ice bath for one-half hour. The solid that precipitated was filtered, rinsed with a cold 1:1 mixture of tetrahydrofuran and water and vacuum dried. This solid was 10.5 g. of unreacted starting material. The total filtrate from above was stripped of tetrahydrofuran on a rotary evaporator. The solid that precipitated during the stripping was filtered and rinsed with cold two percent aqueous p-toluenesulfonic acid solution. This solid was pulled damp dry on the filter, washed twice with 10 ml. portions of isopropyl acetate, and air dried to give 7.9 g. of p - nitrobenzyl - 3 - methyl-7-amino-Δ³-cephem-4-carboxylate p-toluenesulfonic acid salt monohydrate.

The procedure of Example 1 was repeated using dif-cephem-4-carboxylate. The results of these runs are sum-summarized in Table 1.

TABLE 1

| Acid | Acid concn. | Solvent | Amide concn., percent | Temp., °C. | Time, hours | Recovered amide, percent | Amine yield, percent |
|---|---|---|---|---|---|---|---|
| HCl | 1.2M | 4 ml. H₂O / 15 ml. THF | 5 | 66 | 5 | 18 | 54 |
| TsOH | 1.3M | 5 ml. H₂O / 15 ml. (CH₃)₂CO | 5 | 57 | 7 | 16 | 57 |
| H₂SO₄ | 1.8M | 4 ml. H₂O / 20 ml. THF | 5 | 66 | 10 | 21 | 53 |
| MeSO₃H | 1.3M | 5 ml. H₂O / 20 ml. THF | 5 | 66 | 6 | 62 | 30 |
| TsOH | 1.3M | 3 ml. H₂O / 10 ml. CH₃CN | 5 | 65 | 6 | 19 | 57 |
| TsOH | 1.3M | 5 ml. H₂O / 15 ml. DMSO | 5 | 100 | 1 | 11 | 55 |

NOTE: TsOH=p-toluenesulfonic acid; MeSO₃H=methanesulfonic acid; THF=tetrahydrofuran; DMSO=dimethylsulfoxide.

Another series of reactions was run following the procedure of Example 1 except that the starting material was 2,2,2 - trichloroethyl 3 - methyl-7-phenoxyacetamido-Δ³- cephem-4-carboxylate. The results of these runs are summarized in Table 2.

TABLE 2

| Acid | Moles acid/mole amide | Solvent | Amide concn., percent | Temp., °C. | Time, hours | Yield, percent |
|---|---|---|---|---|---|---|
| HCl | 20 | CH₃OH | 0.5 | N 27 | 20 | 47 |
| HCl | 4 | CH₃OH | 4 | N 27 | 15 | 52 |
| TsOH | 2.5 | CH₃OH | 5 | 45 | 22 | 58 |
| TsOH | 1 | CH₃OH | 5 | 65 | 5 | 57 |
| TsOH | 1 | CH₃OH / C₆H₆ | 5 | 65 | 12 | 52 |
| TsOH | 2.5 | C₂H₅OH | 5 | 78 | 4 | 38 |
| TsOH | 12.5 | CH₃OH / H₂O | 5 | 75 | 1.75 | 45 |
| TsOH | 12.5 | H₂O / THF | 5 | 66 | 4.5 | 68 |

I claim:
1. A method for the preparation of a compound having the formula

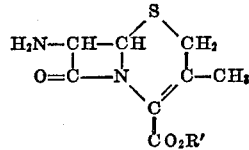

which comprises treating a compound having the formula

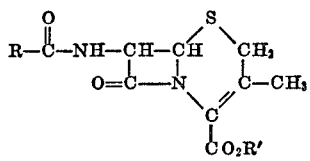

with at least one mole of a solvent having the formula

at a temperature within the range of 0° to 125° C. in the presence of at least 0.25 equivalent of an acid having a pKa of less than 3, wherein R is 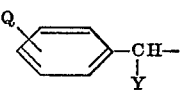

or

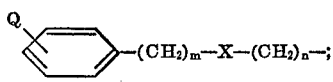

Q is hydrogen, $C_1$ to $C_3$ alkyl, $C_1$ to $C_3$ alkoxy, cyano, nitro, hydroxy, chloro, bromo, or fluoro;
Y is hydrogen or hydroxy;
X is oxygen or sulfur;
m is an integer of 0 to 2;
n is an integer of 1 to 3;
R' is 2,2,2-trichloroethyl or p-nitrobenzyl; and
R" is hydrogen, methyl, ethyl, or propyl.
2. A method as in claim 1 wherein R is benzyl.

3. A method as in claim 2 wherein R" is hydrogen, the acid is p-toluenesulfonic acid, and the temperature is within the range of 25° to 75° C.

4. A method as in claim 1 wherein R is phenoxymethyl.

5. A method as in claim 4 wherein R" is hydrogen, the acid is p-toluenesulfonic acid, and the temperature is within the range of 25° to 75° C.

References Cited

UNITED STATES PATENTS

| | | | |
|---|---|---|---|
| 3,236,841 | 2/1966 | Keuhl et al. | 260—243 C |
| 3,272,809 | 9/1966 | Fardley et al. | 260—243 C |
| 3,492,297 | 1/1970 | Christensen | 260—243 C |
| 3,549,628 | 12/1970 | Chauvette | 260—243 C |
| 3,632,850 | 1/1972 | Garbrecht | 260—243 C |

FOREIGN PATENTS

| | | | |
|---|---|---|---|
| 957,569 | 5/1964 | Great Britain | 260—243 C |

NICHOLAS S. RIZZO, Primary Examiner

U.S. Cl. X.R.

424—246

PO-1050
(5/69)

UNITED STATES PATENT OFFICE
CERTIFICATE OF CORRECTION

Patent No. 3,814,754                    Dated June 4, 1974

Inventor(s) Billy G. Jackson

It is certified that error appears in the above-identified patent and that said Letters Patent are hereby corrected as shown below:

In column 1, in the title, "7-ACYLAMINO" should read ---7-ACYLAMIDO---.

In column 1, line 68, "acrylated" should read ---acylated---.

In column 2, line 54, "Morin Jackson" should read ---Morin-Jackson---.

In column 2, line 56, "es" should read ---ess---.

In column 2, line 59, "group on sub-" should read ---group in sub----.

In column 3, line 23, "exces" should read ---excess---.

In column 3, line 27, "75° The" should read ---75° C. The---.

In column 3, line 53, "cephem-4-carboxylate. The results of these runs are sum-" should read ---ferent acids and different solvent systems. The results are---.

In column 4, Table 2, in the fourth column, "0.5" should read ---0.6---.

Signed and sealed this 19th day of November 1974.

(SEAL)
Attest:

McCOY M. GIBSON JR.                C. MARSHALL DANN
Attesting Officer                  Commissioner of Patents